United States Patent [19]

Mediavilla

[11] Patent Number: 4,669,928
[45] Date of Patent: Jun. 2, 1987

[54] HOLE SAW MANDREL

[76] Inventor: Eugenio Mediavilla, 8040 NW. 36th Ave., Miami, Fla. 33147

[21] Appl. No.: 916,281

[22] Filed: Oct. 7, 1986

[51] Int. Cl.⁴ .............................................. B23B 51/04
[52] U.S. Cl. .................................... 408/68; 408/204; 408/206; 408/703
[58] Field of Search ................. 408/68, 204, 206, 209, 408/223–225, 703, 713; 144/20, 21, 23

[56] References Cited

U.S. PATENT DOCUMENTS

| | | | |
|---|---|---|---|
| 1,645,736 | 10/1927 | Blanch et al. | 408/206 |
| 2,349,400 | 5/1944 | Beckwith | 408/206 |
| 2,484,150 | 10/1949 | Brown | 408/204 |
| 2,754,864 | 7/1956 | Elsy | 408/204 X |
| 3,825,362 | 7/1974 | Hougen | 408/68 |
| 4,148,593 | 4/1979 | Clark | 408/204 |

OTHER PUBLICATIONS

Black & Decker, Sales Catalog, p. 10.

*Primary Examiner*—Gil Weidenfeld
*Assistant Examiner*—Steven C. Bishop
*Attorney, Agent, or Firm*—Jesus Sanchelima

[57] ABSTRACT

A hole saw accessory device that is used with a conventional drill chuck. The device includes a mandrel assembly that includes a tubular member and a locking assembly slidably mounted thereon. The locking assembly is locked against a ring member that is integrally built on one end of the tubular member. An arrowhead drill is used and the mandrel assembly is allowed to slide over a portion of the shank of the drill so that the slug of wood cut out by the conventional hole saw is easily ejected.

5 Claims, 6 Drawing Figures

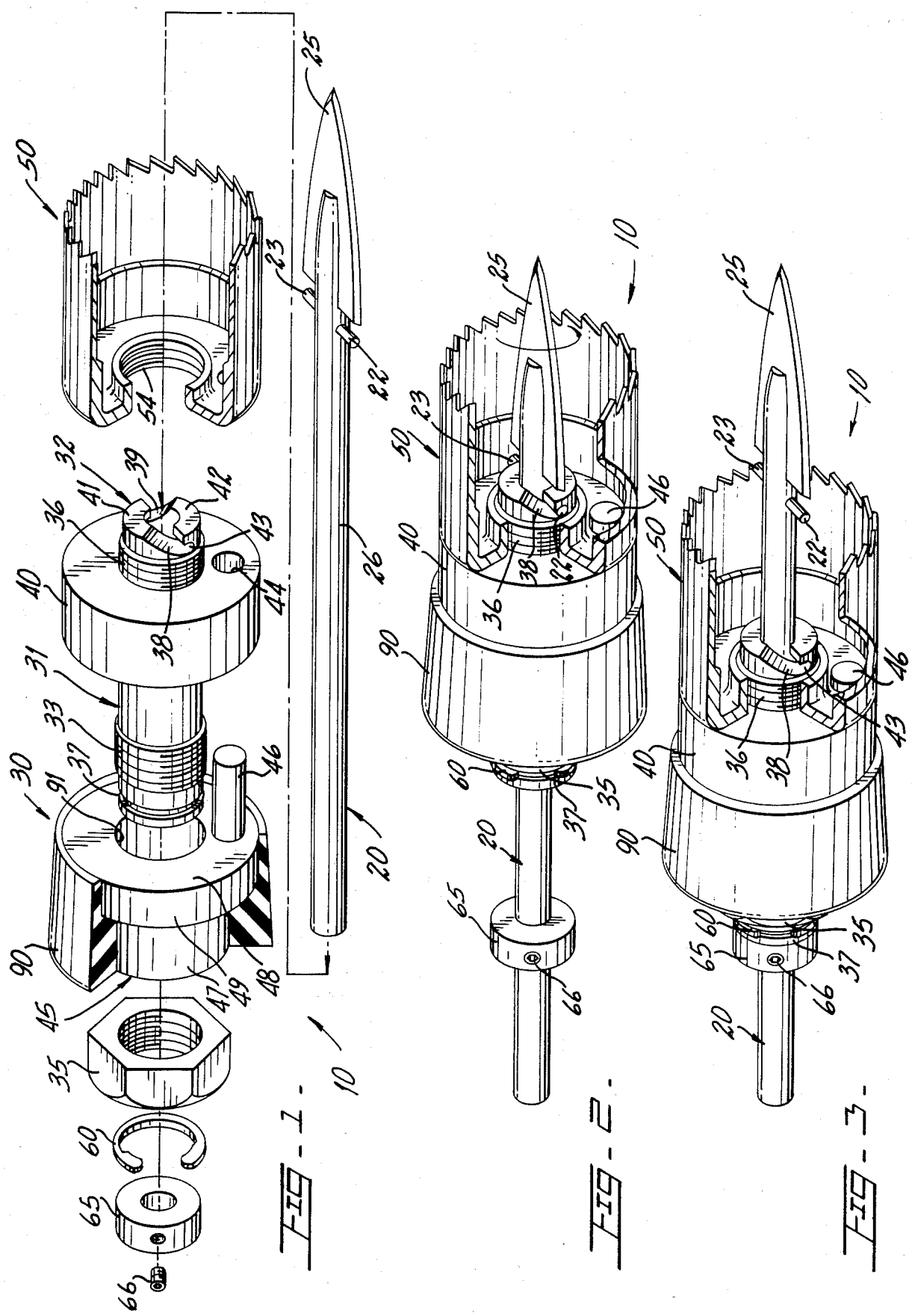

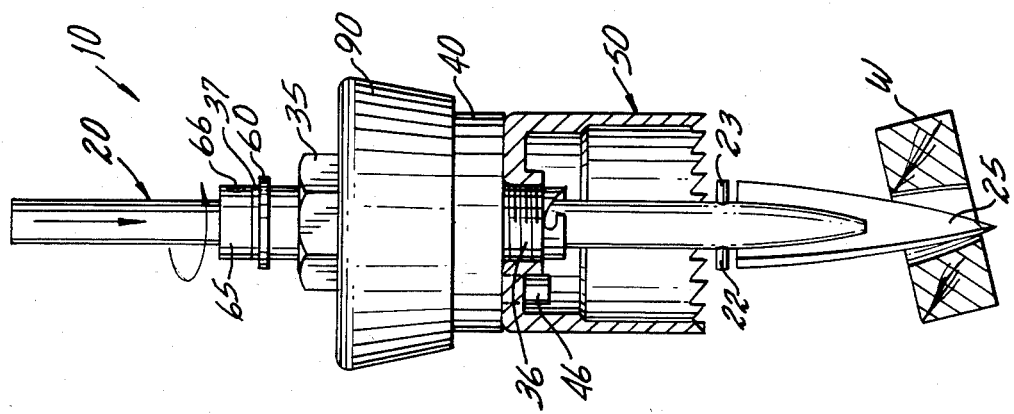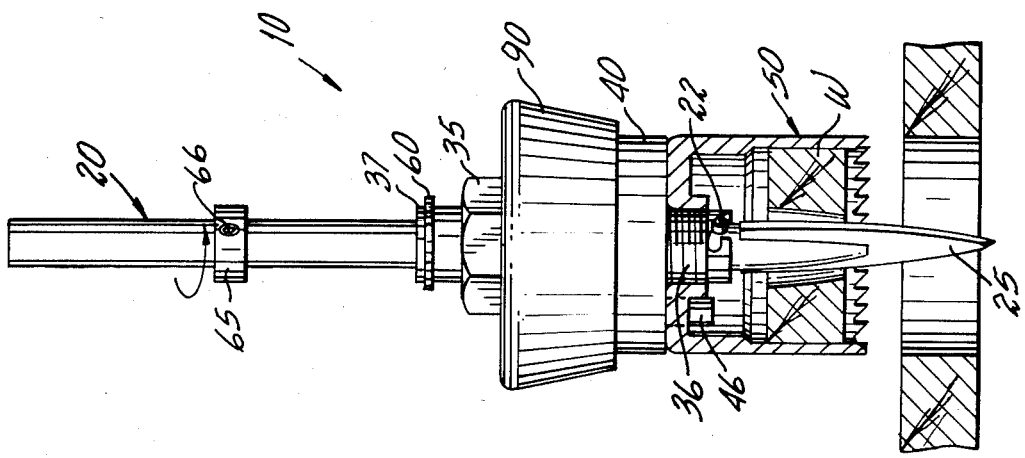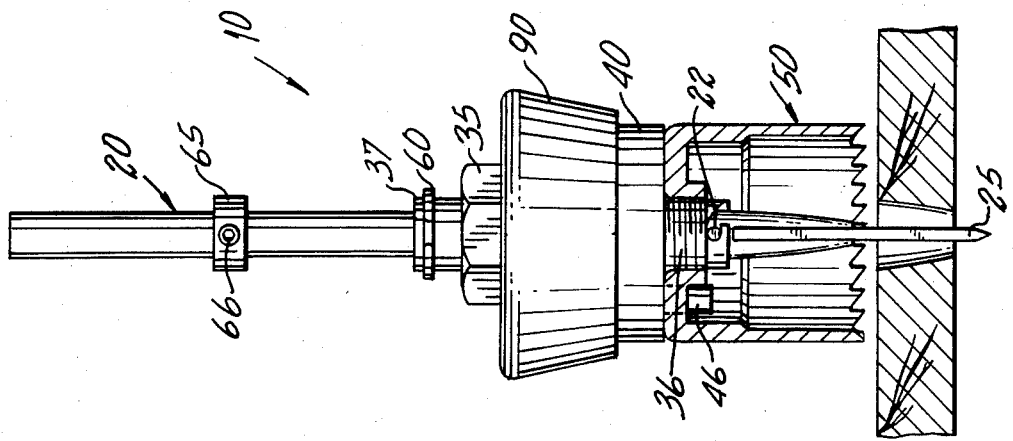

HOLE SAW MANDREL

BACKGROUND OF THE INVENTION

1. Field of the Invention.

The present invention relates to hole saw mandrels, and more particularly to one of such mandrels that allows a quick disengagement of the hole saw from the support mandrel assembly mounted to the shank receivable in a drill chuck.

2. Description of the Related Art.

Hole saws are used as attachments to drill equipment to make round holes. It is common for the material (wood usually) being cut away to lodge itself within the cavity defined by the cylindrical walls of the hole saw. Its removal is an inconvenient time consuming activity that may even be dangerous if the user neglects to disconnect the power of the drill before undertaking the removal. A user is therefore forced to remove the hole saw so that he can insert a tool (such as catalog No. 21910 as shown in the copy of the Black & Decker catalog) in the hole saw to remove the slug after unscrewing the set screw that keeps the hole saw in place. The present invention eliminates the need to use this additional tool.

Other references describing the closest subject matter provide for a number of more or less complicated features that fail to solve the problem in an efficient and economical way. None of these references suggest the novel features of the present invention.

SUMMARY OF THE INVENTION

It is one of the main objects of the present invention to provide an improved and novel mandrel that removes the slug inside a hole saw without having to disengage the hole saw.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents an exploded view of the improved mandrel and a conventional hole saw partially broken.

FIG. 2 shows the improved mandrel in working operation and the arrow indicates the direction of the rotation.

FIG. 3 illustrates the improved mandrel in the slug removal position.

FIG. 4 shows the improved mandrel as it starts cutting through a piece of wood.

FIG. 5 illustrates the mandrel with a wood slug lodged inside the hole saw and the radially extending pins in unlocked position after the shank has been rotated in the direction indicated by the arrow.

FIG. 6 shows the ejection of the slug.

DESCRIPTION OF THE PREFERRED EMBODIMENT

Referring now to FIG. 1, where the present invention is generally referred to with numeral 10, it can be observed that it consists, primarily, of arrow drill bit assembly 20 and mandrel assembly 30. Conventional hole saw member 50 generally conforms with the commercially available hole saws.

It can be seen from FIGS. 1, 2, and 3 that hole saw 50 is screwed to locking termination 32 of tubular member 31 by virtue of mating internal and external thread portions 54 and 36. Locking termination 32 has substantially a tubular circular cross-section with cut out valleys 38 and 39 separating stopper members 41 and 42. Valleys 38 and 39 receive radially extending pins 22 and 23 of arrow drill bit assembly 20 when the shank 26 of the latter is inserted through hole saw 50 and mandrel assembly 30. Pins 22 and 23 end up engaging locking termination 32 at cavity 43 and an opposite cavity (not shown). Ring segment 40 is positioned below termination 32 and it includes guiding hole 44 that receives locking pin 46 of locking assembly 45. Locking assembly 45 has a flanged annular member 49 and downwardly extending skirt member 47 which is integrally built to the underside of annular member 49. Locking pin 46 is rigidly mounted on upper surface 48 of annular member 49. Centrally disposed through hole 91 allows tubular member 31 which in turn coaxially houses shank 26.

Nut 35 mates with threaded portion 33 thereby sandwiching locking assembly 45 with the underside of ring segment 40. A cover 90 is molded over locking assembly 45 and it is intended to facilitate the manipulation of mandrel assembly 30, specially, after it gets hot from drilling many holes. Preferably, rubber is used for cover 90, but any other suitable moldable heat insulative material may be used.

Retainer ring 60 prevents nut 35 from falling off. Retainer ring 60 fits in groove 37. Yoke member 65 acts as a stopper for the whole mandrel assembly 30. Yoke member 65 includes set screw 66 that keeps it in place on shank 26.

In operation, it can be observed from FIG. 4 that arrowhead 25 initiates the opening and then hole saw 50 makes the circular cut in a conventional fashion. Radial pins 22 and 23 (not shown) engage locking termination 32 at cavity 43, thereby moving mandrel assembly 30 and hole saw 50. After the opening is made and hole saw accessory 10 removed, shank 26 is rotated in the opposite direction from the direction it was rotating when drilling. See FIG. 5. Then shank 26 is pushed longitudinally downwardly to eject wood slug W, as shown in FIG. 6. This facilitates the rapid ejection of wood slug W without requiring additional tools to remove it. Conventionally, a standard cylindrical drill is used but an arrowhead drill bit 25 is used to provide better accuracy as to where the opening is initiated, and more important, it pushes out the slug or sometimes the slug even falls itself because of the slant of the walls of the opening created by arrowhead drill bit 25.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense, except as set forth in the following appended claims.

What is claimed is:

1. A hole saw accessory device to be used in conjunction with a drill chuck, comprising:

A. a mandrel assembly including a tubular member having two ends, one of said two ends including a locking termination and a first threaded portion substantially adjacent to said locking termination, and a second threaded portion substantially adjacent to the other end, and said mandrel assembly further including a ring member integrally built adjacent said first thread portion, and said mandrel assembly further including a locking assembly of substantially tubular shape having an inner diameter that operates with and receives said tubular member, and nut means for holding said locking assembly against said ring member, said nut means having an internal thread that is compatible with said second thread portion and said locking assembly so arranged and constructed that it locks said ring member in place; and B. an arrowhead drill assembly including a shank having two ends, said shank being received through said tubular member, and having an arrowhead on one end, and further including locking means that cooperatively lock with said locking termination, and the other end of said shank being receivable in said chuck.

2. The device set forth in claim 1 wherein said ring member includes a guiding hole through said ring member and said locking assembly includes an upwardly extending locking pin that cooperates with said guiding hole thereby locking said ring member with respect to said locking assembly.

3. The device set forth in claim 2 further including:

C. yoke means mounted substantially adjacent to said other end of said shank thereby preventing said tubular member from sliding past said yoke means.

4. The device set forth in claim 3 wherein said tubular member includes a peripheral groove susbtantially adjacent to said other end and further includes retainer means removably mounted on said groove to prevent said nut means from moving.

5. The device set forth in claim 4 wherein said locking termination includes at least one valley cut out that forms a cavity and said locking means of said arrowhead drill assembly includes at least one radially extending locking pin that cooperates with said cavity thereby locking said drill assembly to said locking termination.

* * * * *